United States Patent
Kitagawa et al.

(10) Patent No.: US 8,951,326 B2
(45) Date of Patent: Feb. 10, 2015

(54) REDUCIBLE FERTILIZER

(75) Inventors: Takanori Kitagawa, Tokyo (JP); Yoshio Maekawa, Miki (JP)

(73) Assignee: Asahi Group Holdings, Ltd., Tokyo (JP)

( * ) Notice: Subject to any disclaimer, the term of this patent is extended or adjusted under 35 U.S.C. 154(b) by 0 days.

(21) Appl. No.: 14/351,082

(22) PCT Filed: May 10, 2012

(86) PCT No.: PCT/JP2012/062013
§ 371 (c)(1),
(2), (4) Date: Apr. 10, 2014

(87) PCT Pub. No.: WO2013/094235
PCT Pub. Date: Jun. 27, 2013

(65) Prior Publication Data
US 2014/0250961 A1   Sep. 11, 2014

(30) Foreign Application Priority Data

Dec. 21, 2011   (JP) .................. 2011-279565

(51) Int. Cl.
C05F 5/00       (2006.01)
C05F 11/08      (2006.01)
C05B 17/00      (2006.01)
C05G 1/00       (2006.01)

(52) U.S. Cl.
CPC ................. C05B 17/00 (2013.01); C05F 11/08 (2013.01); C05G 1/00 (2013.01)
USPC .................................................. 71/11; 71/25

(58) Field of Classification Search
None
See application file for complete search history.

(56) References Cited

U.S. PATENT DOCUMENTS 6,187,326 B1 *   2/2001   Yamashita .................... 424/405
2011/0319264 A1 *  12/2011  Kitagawa et al. ............. 504/117

FOREIGN PATENT DOCUMENTS

| JP | 2002254051 A | 9/2002 |
| JP | 2005185187 A | 7/2005 |
| JP | 2005333980 A | 12/2005 |
| JP | 2007131562 A | 5/2007 |
| WO | WO-2006059683 A1 | 6/2006 |
| WO | WO-2010104197 A1 | 9/2010 |

OTHER PUBLICATIONS

International Search Report for PCT/JP2012/062013, dated Jun. 5, 2012.

* cited by examiner

*Primary Examiner* — Wayne Langel
(74) *Attorney, Agent, or Firm* — Marshall, Gerstein & Borun LLP

(57) ABSTRACT

Provided is a high-value added fertilizer using a microorganism or a component of a microorganism and especially a fertilizer capable of promoting the bearing of fruit trees and fruit vegetables. A reducing fertilizer obtained by subjecting a mixture of a microorganism or a component of a microorganism with phosphoric acid component and/or potassium component to a hydrothermal reaction treatment is capable of promoting the growth the roots, especially, the root hairs of fruit trees and also promoting the enlargement of their fruits. In particular, because of the reducing characteristic, the reducing fertilizer of the present invention has an excellent affinity for cells constituting the roots, and enables phosphoric acid component and potassium component, which are useful fertilizer components, to be absorbed effectively.

5 Claims, No Drawings

REDUCIBLE FERTILIZER

TECHNICAL FIELD

The present invention relates to a reducing fertilizer obtained by subjecting a mixture containing a microorganism or a component of a microorganism to a hydrothermal reaction treatment.

BACKGROUND ART

Waste yeast discharged from food production plants such as breweries is subjected to waste treatments by incineration or the like, except for part of the waste yeast being used as raw materials for yeast extracts and yeast preparations, feeds for livestock, fertilizers, and the like. Meanwhile, some of yeast cell walls remaining after extraction of yeast extracts are used for health foods, feeds for livestock, and the like while the rest of the yeast cell walls is mainly discarded.

However, the waste treatments of these microorganism-derived materials entail costs of transport to disposal sites and disposal costs. In addition, in the cases of the above-described conventionally known foods, animal feeds, fertilizers, and the like derived from yeast, some limitations exist in terms of the amount of the waste yeast used relative to the amount of the waste yeast generated, and the like. Hence, there is a need for a new application of waste yeast by which the waste yeast can be provided as a high-value added product.

As a new application of the use of the waste yeast, for example, Patent Literature 1 discloses a method for producing a microorganism-derived reducing mixture having an oxidation-reduction potential of 0 mV or less, the method comprising subjecting a microorganism or a component of a microorganism to a hydrothermal reaction treatment in the absence of oxygen.

Fruit trees, especially, Mikan (*Citrus unshiu*), kaki persimmon (*Diospyros Kaki*), and the like often bear poorly because of shortage of nutrients in the year after they bear heavily, so that almost no fruits can be harvested in the year (biennial bearing). The propensity to the biennial bearing is higher especially in cultivars, such as *Citrus unshiu*, which mature late. Disbudding, fruit thinning, pruning, and the like are conducted to prevent the biennial bearing. However, these entail labor and labor costs, but cannot prevent the biennial bearing radically.

The biennial bearing phenomenon occurs frequently in outdoor growing. Hence, recently, annual bearing in which fruits are borne every year has been made possible to some degree by carefully controlling fertilization and growing in greenhouse growing. However, the greenhouse growing entails enormous costs for constructing the greenhouse and for controlling the temperature and water in the greenhouse. Hence, the prevention of the biennial bearing by greenhouse growing is not widely spread under the current situation.

Moreover, citrus fruits such as Dekopon have strong sour taste, and hence cannot be shipped until the acidity decreases. In this respect, conventional citrus fruits, especially outdoor-grown citrus fruits cannot be shipped early, and are shipped generally two to three months later than those grown in facilities. The early shipment of outdoor-grown citrus fruits enables the fruits grown outdoor at low costs to be sold at high prices, and hence a great increase in profit can be expected.

CITATION LIST

Patent Literature

Patent Literature 1: International Publication No. WO2010/104197

SUMMARY OF INVENTION

Technical Problem

Accordingly, an object of the present invention is to provide a high-value added fertilizer using a microorganism or a component of a microorganism and especially a fertilizer capable of promoting the bearing of fruit trees and fruit vegetables.

Solution to Problem

In view of the above-described problem, the inventors of the present invention have conducted earnest study. As a result, the inventors have found that fruit trees which undergo the biennial bearing or fruit trees whose decrease in acidity is poor are generally poor in growth of the roots and formation of the root hairs, and that the biennial bearing and the poor decrease in acidity of fruit trees are attributable to the poor growth state of the roots of the fruit trees.

Then, the inventors have found that a fertilizer obtained by subjecting a mixture containing a microorganism or a component of a microorganism to a hydrothermal reaction treatment promotes growth of the roots of fruit trees and enlargement of their fruits. These finding have led to the completion of the present invention.

Specifically, the present invention provides a reducing fertilizer obtained by subjecting a mixture of a microorganism or a component of a microorganism with phosphoric acid component and/or potassium component to a hydrothermal reaction treatment.

Advantageous Effects of Invention

The reducing fertilizer of the present invention is obtained by subjecting a mixture of a microorganism or a component of a microorganism with phosphoric acid component and/or potassium component to a hydrothermal reaction treatment. Hence, the reducing fertilizer of the present invention is capable of promoting the growth the roots, especially, the root hairs of fruit trees and also promoting the enlargement of their fruits. In particular, because of the reducing characteristic, the reducing fertilizer of the present invention has an excellent affinity for plant cells, and enables phosphoric acid component and potassium component, which are useful fertilizer components, to be effectively absorbed through the roots and leaf surfaces.

In addition, in the present invention, the hydrothermal reaction treatment on the mixture of a microorganism or a component of a microorganism with phosphoric acid component and/or potassium component makes it possible to obtain a fertilizer having a lower oxidation-reduction potential than the hydrothermal reaction treatment on each of a microorganism or a component of a microorganism, phosphoric acid component and/or potassium component alone.

DESCRIPTION OF EMBODIMENTS

Hereinafter, the present invention will be described in detail.

<Reducing Fertilizer>

A reducing fertilizer of the present invention is obtained by subjecting a mixture of a microorganism or a component of a microorganism with phosphoric acid component and/or potassium component to a hydrothermal reaction treatment.

[Microorganism or Component of Microorganism]

The microorganism or the component of a microorganism used in the present invention is not particularly limited, and conventionally known microorganism materials can be used. The use of a yeast is preferable because of the following reason. Specifically, when a yeast is used in applications such as fertilizers, animal feeds, foods, beverages, supplements, and drugs, it can be expected that these products are readily accepted by consumers because the yeast is very safe. As the yeast, a yeast cultured only for the purpose of the production of the reducing fertilizer of the present invention may be used. However, it is preferable to use a yeast obtained as a surplus waste material discharged from the brewing industries of beer, sake, soybean paste, soy sauce, or the like, from the viewpoint of waste material recycling and reduction of disposal costs of waste materials.

When a yeast is used as the microorganism, a yeast as a whole may be used, or a yeast extract or yeast cell walls produced when a yeast extract is produced may be used. The yeast and yeast component may be any form such as a slurry, one whose water content is reduced by pressing, one whose water content is further reduced by drying, a powder, a suspension liquid, and the like. Specific preferable yeasts and yeast components include brewer's yeast slurrys, pressed brewer's yeasts, dry brewer's yeasts, brewer's yeast suspensions, dry yeast cell walls, yeast cell wall suspensions, brewer's yeast-containing inorganic materials, and the like.

[Phosphoric Acid Component and/or Potassium Component]

The reducing fertilizer of the present invention contains phosphoric acid component and/or potassium component.

(Phosphoric Acid Component)

As the phosphoric acid component used in the reducing fertilizer of the present invention, a phosphoric acid component conventionally known as a component for a fertilizer can be used. Specifically, various soluble or citric acid-soluble fertilizers may be used, which include superphosphate of lime obtained by treating phosphate ore with sulfuric acid to obtain a soluble phosphoric acid component; triple superphosphate; a fused phosphate fertilizer and a calcined phosphate fertilizer, which are mixtures; and the like. One of these phosphoric acid components can be used alone, or two or more thereof may be used as a mixture.

(Potassium Component)

As the potassium component contained in the reducing fertilizer of the present invention, a potassium component conventionally known as a fertilizer may be used, and the potassium component specifically includes potassium chloride, potassium sulfate, potassium hydroxide, potassium nitrate, and the like. One of these potassium components may be used alone, or two or more thereof may be used as a mixture.

[Other Components]

The reducing fertilizer of the present invention may further contain nitrogen such as ammonium sulfate or ammonium chloride; calcium such as calcium oxide, calcium hydroxide, or calcium carbonate; magnesium; diatomaceous earth; and the like. When any one of these components is added, the component may be added to the mixture before the hydrothermal reaction treatment, or to the reducing fertilizer after the hydrothermal reaction treatment. However, it is not preferable to add the component before the hydrothermal reaction treatment, if the component is denatured under a condition of a high temperature or the like.

[Hydrothermal Reaction Treatment]

In the present invention, the hydrothermal reaction treatment for providing the reducing fertilizer refers to a treatment carried out preferably at 120° C. or higher and 220° C. or lower, and more preferably at 150° C. or higher and 210° C. or lower. Meanwhile, the pressure is preferably 0.9 MPa or higher and 1.9 MPa or lower, and more preferably 1.2 MPa or higher and 1.8 MPa or lower. In particular, a hydrothermal reaction treatment carried out at a pressure of 0.9 MPa or higher and 1.9 MPa or lower and at 120° C. or higher and 220° C. or lower is preferable, a hydrothermal reaction treatment carried out at 0.9 MPa or higher and 1.9 MPa or lower and at 150° C. or higher and 210° C. or lower is more preferable, and a hydrothermal reaction treatment carried out at 1.2 MPa or higher and 1.8 MPa or lower and 150° C. or higher and 210° C. or lower is further preferable.

[Characteristics of Reducing Fertilizer]

Next, characteristics of the microorganism-derived reducing mixture of the present invention are described below.

In general, the oxidation-reduction potentials of eukaryotes that conduct respiration are around −180 mV. The reducing fertilizer of the present invention contains a large amount of components with low oxidation-reduction potentials. Hence, the reducing fertilizer has an excellent affinity for cells constituting plant or the like, and can cause the components such as phosphoric acid component and/or potassium component and yeast-derived components, which are confirmed to be effective as of now, to effectively act on the plant or the like. In addition, the reducing fertilizer of the present invention has a lower oxidation-reduction potential than a simple mixture of a microorganism or a component of a microorganism subjected to the hydrothermal reaction treatment with phosphoric acid component and/or potassium component. Hence, the efficacies of these components can be further improved.

Moreover, since brewer's yeasts and the like are preferable as the raw material of the microorganism-derived reducing mixture of the present invention, the quality stability of the raw material can be secured, and conversion of waste material derived from brewer's yeasts into a high-value added product can be expected.

In particular, since phosphoric acid component and potassium component promotes the bearing of fruits, the biennial bearing of fruit trees can be prevented when these components are caused to effectively act by using the reducing fertilizer of the present invention. In addition, the reducing fertilizer of the present invention promotes the growth of the roots, and hence promotes the decrease in acidity of citrus fruits and the like. This enables early harvest, and makes it possible to bring a great increase in profits to farmers.

Note that agricultural plants to which the reducing fertilizer of the present invention is applicable are not particularly limited, and include Mikan (*Citrus unshiu*), Dekopon (Siranuhi, (*Citrus unshiu*×*C. sinensis*)×*C. reticulata*), Iyokan (*Citrus iyo*), apple (*Malus domestica*), kaki persimmon (*Diospyros kaki*), tomato (*Solanum lycopersicum*), cucumber (*Cucumis sativus* L.), eggplant (*Solanum melongena*), strawberry (*Fragaria*×*ananassa*), and the like.

EXAMPLES

Hereinafter, the present invention will be described in detail based on Examples. Note that the present invention is not limited to Examples shown below at all.

Production Example 1

Hydrothermal Reaction Treatment Product of Yeast Cell Walls

Into a magnetic stirring type hydrothermal reactor, 170 g of distilled water was introduced, and then 30 g of yeast cell walls were introduced. The reactor was closed with a lid, and the mixture was stirred. Then, the gas phase portion was replaced with nitrogen gas, and the temperature elevation was started. A treatment was conducted for 10 minutes under conditions of a pressure of 1.6 MPa or higher and a temperature of 180° C. Thus, Fertilizer 1 was obtained.

Production Example 2

Hydrothermal Reaction Treatment Product of Mixture of Yeast Cell Walls with Phosphoric Acid Component Reducing Fertilizer 2 was obtained in the same manner as in Production Example 1, except that a mixture of 27.6 g of yeast cell walls with 156.2 g of distilled water and 16.2 g of 85% phosphoric acid as the phosphoric acid component was used as the material on which the hydrothermal reaction treatment was conducted.

Production Example 3

Hydrothermal Reaction Treatment Product of Mixture of Yeast Cell Walls with Potassium Component Reducing Fertilizer 3 was obtained in the same manner as in Production Example 1, except that a mixture of 27.8 g of yeast cell walls with 157.4 g of distilled water and 14.8 g of potassium sulfate as the potassium component was used as the material on which the hydrothermal reaction treatment was conducted.

Production Example 4

Hydrothermal Reaction Treatment Product of Mixture of Yeast Cell Walls with Phosphoric acid Component and Potassium Component Reducing Fertilizer 4 was obtained in the same manner as in Production Example 1, except that a mixture of 25.4 g of yeast cell walls with 143.6 g of distilled water, 16.2 g of 85% phosphoric acid as the phosphoric acid component, and 14.8 g of potassium sulfate as the potassium component was used as the material on which the hydrothermal reaction treatment was conducted.

Test Example 1

The oxidation-reduction potentials of the following samples of the fertilizers were measured:
Sample 1: Fertilizer 1,
Sample 2: Aqueous solution of 8.1 parts by mass of 85% phosphoric acid and 91.9 parts by mass of distilled water,
Sample 3: Mixture of 8.1 parts by mass of 85% phosphoric acid and 91.9 parts by mass of Fertilizer 1,
Sample 4: Reducing Fertilizer 2,
Sample 5: Aqueous solution of 7.4 parts by mass of potassium sulfate and 92.6 parts by mass of distilled water,
Sample 6: Mixture of 7.4 parts by mass of potassium sulfate and 92.6 parts by mass of Fertilizer 1,
Sample 7: Reducing Fertilizer 3,
Sample 8: Aqueous solution of 8.1 parts by mass of 85% phosphoric acid, 7.4 parts by mass of potassium sulfate, and 84.5 parts by mass of distilled water,
Sample 9: Mixture of 8.1 parts by mass of 85% phosphoric acid, 7.4 parts by mass of potassium sulfate, and 84.5 parts by mass of Fertilizer 1, and
Sample 10: Reducing Fertilizer 4.
Table 1 shows the results.

TABLE 1

| | Oxidation-reduction potential (mV) |
|---|---|
| Sample 1 | −226 |
| Sample 2 | +556 |
| Sample 3 | +336 |
| Sample 4 | +182 |
| Sample 5 | +490 |
| Sample 6 | +47 |
| Sample 7 | −235 |
| Sample 8 | +79 |
| Sample 9 | −95 |
| Sample 10 | −256 |

As is apparent from Table 1, lower oxidation-reduction potentials were obtained in the cases where the mixtures of phosphoric acid component and/or potassium component with a microorganism or a component of a microorganism were subjected to the super heated vapor treatment than in the cases of phosphoric acid component and/or potassium component alone and the cases where phosphoric acid component and/or potassium component were mixed with Fertilizer 1 obtained by subjecting a microorganism or a component of a microorganism to the hydrothermal reaction treatment.

Test Example 2

Samples 1, 8, and 10 used in Test Example 1 were applied to Mikan from May 6, 2008 (Heisei 20) in a Mikan grove in Shikokuchuo City, Ehime Prefecture, and the total yield per 10 Mikan trees was investigated from the first to third year.
Table 2 shows the results.

TABLE 2

| | First year | Second year | Third year |
|---|---|---|---|
| Untreated group | 582 | 93 | 682 |
| Sample 1 | 705 | 380 | 698 |
| Sample 8 | 596 | 85 | 680 |
| Sample 10 | 720 | 630 | 698 |

As is apparent from Table 2, the application of the reducing fertilizer of the present invention to Mikan resulted in active growth of the roots, which increased the nutrient uptake ability, and at the same time promotion of enlargement of the fruits. Thus, the yield was increased, and the decrease in yield due to the biennial bearing was successfully suppressed.

Test Example 3

Fertilizers 1, 8, and 10 were applied from May 6, 2008 (Heisei 20) in the same manner as in Test Example 2, except that appropriate additional fertilizer application was further conducted after the harvest every year, and the total yield per 10 Mikan trees was investigated from the first to third year.

Table 3 shows the results.

TABLE 3

|  | First year | Second year | Third year |
|---|---|---|---|
| Untreated group | 695 | 88 | 645 |
| Sample 8 | 698 | 82 | 646 |
| Sample 10 (with additional fertilizer application) | 752 | 495 | 650 |
| Sample 10 (without additional fertilizer application) | 763 | 625 | 700 |

As is apparent from Table 3, the application of the reducing fertilizer of the present invention to Mikan and the appropriate additional fertilizer application after the harvest resulted in active growth of the roots, which increased the nutrient uptake ability, and at the same time promotion of enlargement of fruits. Thus, the yield was increased, and the decrease in yield due to the biennial bearing was successfully suppressed.

Test Example 4

Sample 10 used in Test Example 1 was applied to Dekopon in a Dekopon grove for outdoor growing in Saijo City, Ehime Prefecture in fiscal year 2009 (Heisei 21) and fiscal year 2010 (Heisei 22), and the acidity of the Dekopon was measured from the end of August to the middle of March. Table 4 shows the results in fiscal year 2009 (Heisei 21), and Table 5 shows the results in fiscal year 2010 (Heisei 22).

TABLE 4

|  | 8/29 | 10/3 | 10/30 | 12/3 | 1/5 | 1/11 | 1/21 |
|---|---|---|---|---|---|---|---|
| Untreated group | 3.96 | 2.81 | 2.30 | 1.61 | 1.44 | 1.68 | 2.00 |
| Untreated group | 4.36 | 2.75 | 2.37 | 1.92 | 1.46 | 1.39 | 1.51 |
| Sample 10 | 2.61 | 1.97 | 1.21 | 0.91 | 0.97 |  |  |

|  | 2/1 | 2/11 | 2/21 | 3/1 | 3/11 |
|---|---|---|---|---|---|
| Untreated group | 1.31 | 1.22 | 1.19 | 1.10 | 1.00 |
| Untreated group | 1.31 | 1.20 | 1.13 | 1.00 |  |
| Sample 10 |  |  |  |  |  |

TABLE 5

|  | 8/31 | 10/2 | 10/29 | 11/30 | 1/4 | 1/21 | 2/1 | 2/11 | 2/21 |
|---|---|---|---|---|---|---|---|---|---|
| Untreated group | 3.57 | 2.55 | 2.42 | 1.76 | 1.42 | 1.40 | 1.31 | 1.00 |  |
| Untreated group | 3.00 | 2.48 | 1.79 | 1.27 | 1.47 | 1.49 | 1.15 | 1.05 | 0.96 |
| Sample 10 | 2.2 | 1.9 | 1.3 | 1.0 | 0.9 |  |  |  |  |

As is apparent from Tables 4 and 5, the application of the reducing fertilizer of the present invention promoted the decrease in acidity of Dekopon, which made it possible to ship the Dekopon early.

The invention claimed is:

1. A reducing fertilizer obtained by subjecting a mixture of a yeast, an extract of a yeast, or a cell wall of a yeast with a phosphoric acid component and a potassium component to a hydrothermal reaction treatment.

2. The reducing fertilizer of claim 1, further comprising diatomaceous earth.

3. The reducing fertilizer of claim 1, wherein the yeast, the extract of the yeast, or the cell wall of the yeast is derived from at least one selected from the group consisting of brewer's yeast slurrys, pressed brewer's yeasts, dry brewer's yeasts, brewer's yeast suspensions, dry yeast cell walls, yeast cell wall suspensions, and brewer's yeast-containing inorganic materials.

4. The reducing fertilizer of claim 2, wherein the yeast, the extract of the yeast, or the cell wall of the yeast is derived from at least one selected from the group consisting of brewer's yeast slurrys, pressed brewer's yeasts, dry brewer's yeasts, brewer's yeast suspensions, dry yeast cell walls, yeast cell wall suspensions, and brewer's yeast-containing inorganic materials.

5. The reducing fertilizer according to claim 1, wherein the hydrothermal reaction treatment is carried out at 0.9 MPa or higher and 1.9 MPa or lower, and at 150° C. or higher and 210° C. or lower.

* * * * *